US012791661B2

(12) United States Patent
Fliess

(10) Patent No.: US 12,791,661 B2
(45) Date of Patent: Nov. 10, 2026

(54) TIME SYNCHRONIZATION TESTING OF CASCADED RADAR TRANSCEIVER CHIPS

(71) Applicant: NXP B.V., Eindhoven (NL)

(72) Inventor: Thomas Fliess, Austin, TX (US)

(73) Assignee: NXP B.V., Eindhoven (NL)

( * ) Notice: Subject to any disclaimer, the term of this patent is extended or adjusted under 35 U.S.C. 154(b) by 287 days.

(21) Appl. No.: 18/398,869

(22) Filed: Dec. 28, 2023

(65) Prior Publication Data

US 2025/0216508 A1 Jul. 3, 2025

(51) Int. Cl.
*G01S 7/40* (2006.01)
*G01S 13/931* (2020.01)

(52) U.S. Cl.
CPC .......... *G01S 7/4052* (2013.01); *G01S 7/4008* (2013.01); *G01S 7/4021* (2013.01); *G01S 13/931* (2013.01)

(58) Field of Classification Search
None
See application file for complete search history.

(56) References Cited

U.S. PATENT DOCUMENTS 10,746,850 B2 8/2020 Breen et al.
11,841,457 B2 12/2023 Tsutsumi et al.
2019/0386665 A1 12/2019 Shalita et al.
2021/0165088 A1 6/2021 Suzuki
2022/0196796 A1* 6/2022 Fiore .................... G01S 13/581
2022/0334217 A1* 10/2022 Gulden .................. G01S 13/87
2022/0349992 A1 11/2022 Tsutsumi et al.
2023/0258771 A1* 8/2023 Jungmaier ........... G01S 7/4073 342/165

FOREIGN PATENT DOCUMENTS

EP 3483622 B1 8/2020
EP 2972468 B1 10/2020

* cited by examiner

*Primary Examiner* — Bernarr E Gregory
*Assistant Examiner* — Brandon James Henson

(57) ABSTRACT

A radar system employs a self-test to determine time synchronization of cascaded radar transceiver integrated circuits (ICs) in the radar system that are used in a motor vehicle. To effectively detect information in the environment, the radar system periodically executes the self-test operation by sending a trigger signal to at least one follower radar transceiver IC. Moreover, the leader radar transceiver IC generates a chirp signal at a set frequency and transmits this. In response to receiving the trigger signal, the at least one follower radar transceiver IC receives the chirp signal transmitted from leader and generates its own local chirp signal with the set frequency, but also includes a frequency offset. The local chirp signal is then used to down-convert the received signal into an intermediate frequency (IF) signal. The IF signal is filtered, analog-to-digital converted, and processed to determine a beat frequency. The beat frequency is compared to the frequency offset to determine the level of synchronization between the leader radar transceiver IC and the at least one follower radar transceiver IC.

20 Claims, 5 Drawing Sheets

TIME SYNCHRONIZATION TESTING OF CASCADED RADAR TRANSCEIVER CHIPS

BACKGROUND

A radar system of a motor vehicle performs a self-test frequently to determine operational status and satisfy functional safety standards. Functional safety standards include functioning of hardware and/or software of the motor vehicle, such as the radar system that operates within a normal range. During the self-test, one or more radar transceiver chips of the radar system are checked for errors that prevent the motor vehicle from operating safely. The connection of multiple radar transceiver chips includes a leader radar transceiver IC and one or more follower radar transceiver ICs. To ensure safe operation of the motor vehicle, the leader radar transceiver IC transmits a trigger signal to check time synchronization between the leader radar transceiver IC and the follower radar transceiver ICs by using a chirp signal. In response to the trigger signal, the follower radar transceiver ICs transmit a loopback signal to the leader radar transceiver IC to check timing between the loopback signal and the chirp signal. However, in order to employ the loopback signal, additional wiring is added between the leader radar transceiver IC and the follower radar transceiver IC.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
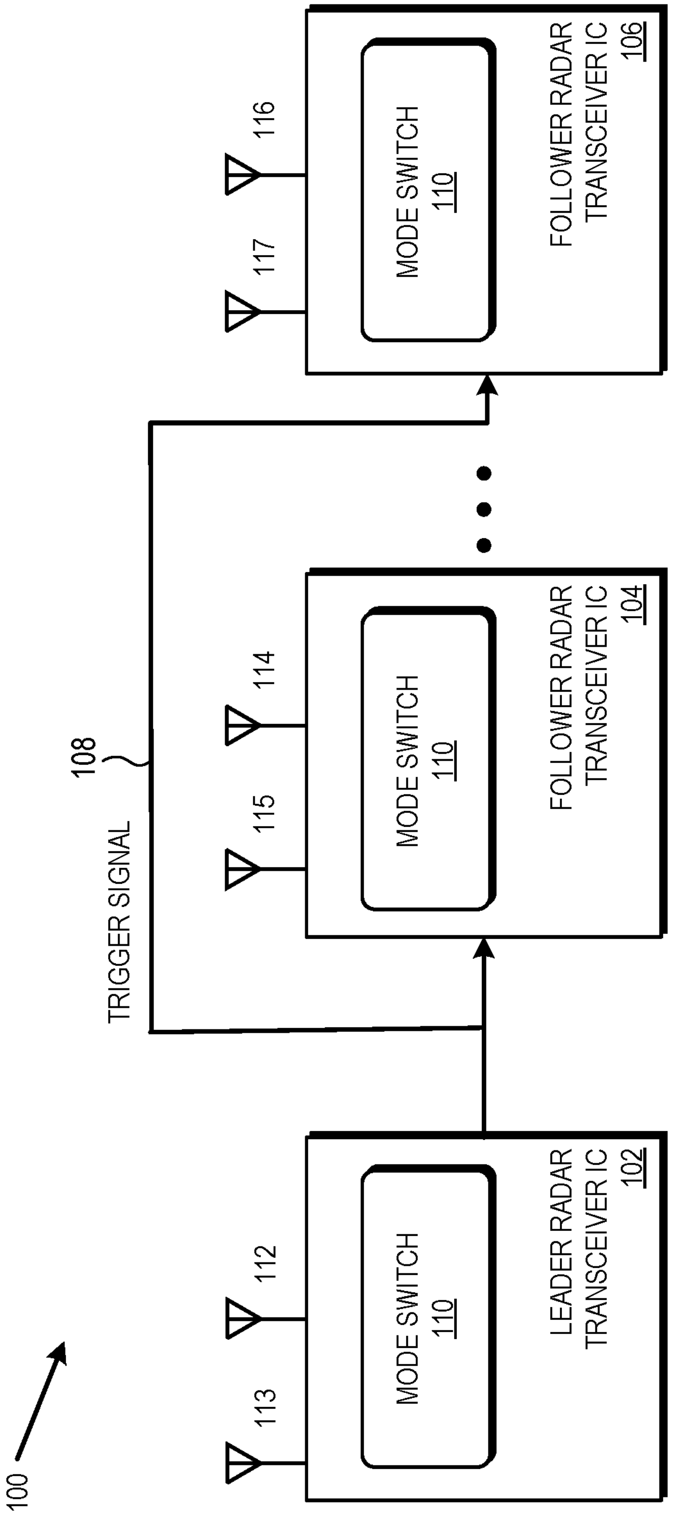
FIG. 1 is a block diagram of a radar system implementing a leader radar transceiver IC transmitting a trigger signal to a plurality of follower radar transceiver IC in accordance with some embodiments.

FIGS. 1-6 illustrate systems and techniques for time synchronization of cascaded radar transceiver integrated circuits (ICs) in a radar system that are used in a motor vehicle. To simplify manufacturing, radar transceiver ICs often include a relatively small number (e.g., four) antennas to send and/or receive signals. To overcome the limited number of antenna and improve detection ability of the radar system, the radar transceiver ICs are cascaded (that is connected to each other with one IC acting as a leader and the other ICs as followers) to increase the number of antenna that transmit and/or receive the signals. For example, the leader radar transceiver IC in the radar system of the motor vehicle transmits a chirp signal, and each radar transceiver IC (both the leader and followers) listens for return of the at least one signal after it has bounced or reflected off the object, the person, or the other vehicle. Upon receipt of the at least one signal, the leader transceiver IC sends information about the object (e.g., a distance, velocity, or other information) for further processing by a control system of the motor vehicle. The data detected in the environment by the radar system provides visualization of the environment for the motor vehicle that is used as a safety measure.

The radar system provides input data for the control system of the motor vehicle during autonomous driving. Additionally, the radar system supports functional safety for the motor vehicle and, in particular, is used by the motor vehicle to mitigate dangers in the environment by alerting passengers in the motor vehicle or using communication systems to transmit the alert to a remote device (e.g., a computing device, a phone, a tablet computer). To effectively detect information in the environment and provide this functional safety, the radar system periodically executes a self-diagnostic operation by sending a trigger signal to the at least one follower radar transceiver IC in response to an event, which, in some embodiments, includes start of the trigger signal, a timer within the IC, software, and the like. Moreover, the leader radar transceiver IC generates a chirp signal at a set frequency and transmits this. In response to receiving the trigger signal, the at least one follower radar transceiver IC receives the chirp signal transmitted from leader and generates its own local chirp signal with the set frequency, but also includes a frequency offset. The local chirp signal is then used to down-convert the received signal into an intermediate frequency (IF) signal. The IF signal is filtered, analog-to-digital converted (A/D-converted) and processed to determine a beat frequency.

The beat frequency is compared to the frequency offset to determine a level of synchronization between the leader radar transceiver IC and the at least one follower radar transceiver IC. If the beat frequency matches the frequency offset, the leader radar transceiver IC and the at least one follower radar transceiver IC are confirmed as time synchronous. However, if the beat frequency does not match the frequency offset, the leader radar transceiver IC and the at least one follower radar transceiver IC are asynchronous at that time. Thus, by measuring the beat frequency, the synchronization of the leader radar transceiver IC and the at least one follower radar transceiver IC is determined. Furthermore, through the application of the frequency offset, time synchronization is tested without adding additional hardware to the radar system. Also, using the techniques herein, a loopback path (i.e., a wiring connection between input/output (I/O) ports) used in conventional cascaded radar transceiver ICs is not needed.

In conventional cascaded radar transceiver ICs, the at least one follower radar transceiver IC has a synthesizer (a.k.a., a local oscillator or LO) that is disabled such that the follower radar transceiver IC does not generate its own chirp signal. In contrast, using the techniques described herein, the synthesizer of the at least one follower radar transceiver IC is enabled. The leader radar transceiver IC sends a trigger signal to the at least one follower radar transceiver IC to begin operation. Simultaneously, the leader radar transceiver IC generates the chirp signal using its own synthesizer. Subsequently, the at least one follower radar transceiver IC generates a chirp signal using its own synthesizer, applying the frequency offset to the set frequency.

By applying the frequency offset to the chirp signal using the synthesizer of the at least one follower radar transceiver IC, the time synchronization of the radar ICs of the radar system can be tested. To provide acceptable safety margins, it is desirable for the radar system to be operational for a substantial portion (e.g., more than 99%) of the time that the motor vehicle is in operation because the motor vehicle receives the information from the radar system to visualize and identify dangers in the environment. Moreover, the radar system is employed by the control system during autonomous driving. In order to identify operational status of the radar system, the leader radar transceiver IC sends the trigger signal to the at least one follower radar transceiver IC. However, the responsiveness of the at least one follower radar transceiver IC is uncertain for various reasons. For example, the motor vehicle operates in a noisy environment while moving (i.e., driving), which affects receipt of the trigger signal by the at least one follower. Additionally, in some cases, the at least one follower radar transceiver IC has faulty hardware (e.g., antenna) that prevents or delays reception of the trigger signal. In any of the aforementioned scenarios, the at least one follower radar transceiver IC is affected which affects receipt of the trigger signal. The prevent and/or delay of reception of the trigger signal correspondingly prevents and/or delays operation on the at least one follower radar transceiver IC. In some cases, the at least one follower radar transceiver IC is prematurely triggered due to electromagnetic interference which results in premature operation of the at least one follower radar transceiver IC. As such, the synchronization between the leader radar transceiver IC and the at least one follower radar transceiver IC is impacted. Therefore, poor synchronization of the leader radar transceiver IC and the at least one follower radar transceiver IC prevents proper combination of the data detected of the environment and the radar system cannot be relied upon. Accordingly, testing of time synchronization between the leader radar transceiver IC and the at least one follower radar transceiver IC improves identification of reliability of the radar system.

FIG. 1 illustrates a block diagram of a radar system 100 implementing a leader radar transceiver IC 102 (i.e., a radar sensor) transmitting a trigger signal 108 to a plurality of follower radar transceiver ICs 104 and 106 (i.e., radar sensors) in accordance with some embodiments. In the depicted example, the radar system 100 includes the leader radar transceiver IC 102 and the follower radar transceiver ICs 104 and 106. It will be appreciated that in some embodiments, there is only a single follower radar transceiver IC, such as the follower radar transceiver IC 104 or 106. However, in some embodiments, there are more than two of the follower radar transceiver ICs 104 and 106. In various embodiments, the radar system 100 is connected to a motor vehicle (not shown) to provide environmental data surrounding the motor vehicle. In other words, the radar system 100 is part of the motor vehicle to detect the environment around the motor vehicle. For example, the radar system 100 is used to detect objects, people, other motor vehicles, and the like.

In various embodiments, the leader radar transceiver IC 102 is connected to the follower radar transceiver ICs 104 and 106. Specifically, the leader radar transceiver IC 102 is cascaded with the follower radar transceiver ICs 104 and 106. In other words, the leader radar transceiver IC 102 is directly connected or linked to the follower radar transceiver ICs 104 and 106, such as connecting one or more output ports of the leader radar transceiver IC 102 to one or more input ports of the follower radar transceiver ICs 104 and 106. By cascading the leader radar transceiver IC 102 with the follower radar transceiver ICs 104 and 106, the detection ability of the radar system 100 to detect data in the environment is improved due to an increased number of radar sensors transmitting and/or receiving data. In order to control operation of the leader radar transceiver IC 102 and the follower radar transceiver ICs 104 and 106, the leader radar transceiver IC 102 sends the trigger signal 108 to the follower radar transceiver ICs 104 and 106 over a dedicated line (i.e., a direct connection) in response to an event. For example, in some embodiments, the event includes start of the trigger signal 108, a timer within the IC, software, an input received by the leader radar transceiver IC 102 from an external control device (e.g., computer, terminal, phone), and the like. In other words, the leader radar transceiver IC 102 uses the trigger signal 108 as an initiation signal or a command to the follower radar transceiver ICs 104 and 106 to begin additional operations. Furthermore, the follower radar transceiver ICs 104 and 106 begin the same operations as the leader radar transceiver IC 102 in response to the trigger signal 108, such as testing or normal radar detection, as will be described in more detail below.

In the depicted example, the leader radar transceiver IC 102 and each of the follower radar transceiver ICs 104 and 106 include a mode switch 110. It will be appreciated that while the mode switch 110 is illustrated as a part of the leader radar transceiver IC 102 and the follower radar transceiver ICs 104 and 106, in some embodiments, all or a portion of the mode switch 110 is a separate component and/or detached from the leader radar transceiver IC 102 and the follower radar transceiver ICs 104 and 106. In various embodiments, the mode switch 110 is used to control operations on the leader radar transceiver IC 102 and the follower radar transceiver ICs 104 and 106. The leader radar transceiver IC 102 and the follower radar transceiver ICs 104 and 106 perform normal detection of the environment around the motor vehicle in response to receipt of the trigger signal 108 and the mode switch 110 set to a first setting (e.g., normal detection mode). Additionally, the leader radar transceiver IC 102 and the follower radar transceiver ICs 104 and 106 perform a self-test or a self-diagnostic in response to receipt of the trigger signal 108 and the mode switch 110 set to a second setting (e.g., test mode, built-in self-test or BIST). The self-test or the test mode ensures operation of the follower radar transceiver ICs 104 and 106 with respect to the leader radar transceiver IC 102. Specifically, the leader radar transceiver IC 102 and the follower radar transceiver ICs 104 and 106 select the test mode via the mode switch 110. The test mode is used to determine successful and/or timely receipt of the trigger signal 108 by the follower radar transceiver ICs 104 and 106. Successful and/or timely receipt of the trigger signal by the follower radar transceiver ICs 104 and 106 results in successful and/or timely operation of the follower radar transceiver ICs 104 and 106. Moreover, successful and/or timely receipt of the trigger signal 108 by the follower radar transceiver ICs 104 and 106 indicates time synchronous operation between the leader radar transceiver IC 102 and the follower radar transceiver ICs 104 and 106. To operate within safety margins established by a manufacturer and/or a motor vehicle industry, the leader radar transceiver IC 102 and the follower radar transceiver ICs 104 and 106 use the test mode to ensure receipt of the trigger signal 108 in a time synchronous manner. The safety margins include functional safety, which are standards for motor vehicle components that are determined by the manufacturer and/or the motor vehicle industry to operate under certain conditions to ensure safety of the motor vehicle. To illustrate, the motor vehicle is operated (i.e., driven) on roads and/or other locations that subject the motor vehicle to external factors, such as unintended movement (e.g., shaking, bouncing), wind noise, noise from the environment, and the like. The external factors affect receipt of the trigger signal 108 by the follower radar transceiver ICs 104 and 106, which prevents and/or delays reception of the trigger signal 108. The prevention and/or delay of reception of the trigger signal 108, in turn, prevents and/or delays response of the follower radar transceiver ICs 104 and 106. Therefore, the radar system 100 is impacted and an inaccurate detection by the radar system 100 occurs. Thus, based on the aforementioned example scenario, the functional safety of the radar system 100 is impacted because it does not provide accurate data for the motor vehicle to use.

During the test mode, the leader radar transceiver IC 102 issues the trigger signal 108, which is received by the follower radar transceiver ICs 104 and 106. After a predefined period of time, the leader radar transceiver IC 102 and the follower radar transceiver ICs 104 and 106 start simultaneously. The leader radar transceiver IC 102 generates a chirp signal at a set frequency, herein represented as $f_{CS,Leader}$. It should be noted that the chirp signal is characterized with a frequency ($f_{CS}$), a duration T, and a bandwidth B. The chirp slope is derived as $K_f$=B/T. Additionally, in response to receiving the chirp signal, the follower radar transceiver ICs 104 and 106 generate their own local chirp signal. The local chirp signal is parameterized by the sum of the set frequency ($f_{CS,Leader}$) and a frequency offset ($\Delta f_{Nominal}$), which is defined as $f_{CS,Follower}=f_{CS,Leader}+\Delta f_{Nominal}$. The follower radar transceiver ICs 104 and 106 receive the chirp signal from leader transceiver IC 102 and down-convert it to the IF signal using the local chirp signal. The follower radar transceiver ICs 104 and 106 filter and convert (e.g., A/D-convert) the resulting IF signal to determine a beat frequency (i.e., a difference in frequency between the chirp signal that was received and the local chirp signal that is used for down-conversion). The follower radar transceiver ICs 104 and 106 compare the beat frequency to the frequency offset to determine a level of synchronization between the leader radar transceiver IC 102 and the follower radar transceiver ICs 104 and 106, such that the beat frequency is within a frequency range with respect to the frequency offset. In particular, the difference between the beat frequency and the frequency offset is calculated by each of the follower radar transceiver ICs 104 and 106 to identify whether the beat frequency is within the frequency range. For example, the follower radar transceiver IC 104 and the follower radar transceiver IC 106 individually and separately confirm time synchronization or "in sync" to the leader radar transceiver IC 102 in response to the beat frequency matching the frequency offset within the frequency range, which is represented as $f_{Beat}=\Delta f_{Nominal}\pm f_{threshold}$. As a result, the leader radar transceiver IC 102 and the follower radar transceiver ICs 104 and 106 are identified as time synchronous during any round of the test mode. Alternatively, the follower radar transceiver IC 104 and the follower radar transceiver IC 106 individually and separately confirm time asynchronization or "async" to the leader radar transceiver IC 102 in response to the beat frequency exceeding the frequency range (a.k.a., exceeding a synchronization threshold), and therefore not matching the frequency offset during any round of the test mode. All of the aforementioned processes occur simultaneously over a single chirp period (i.e., during transmission of the chirp signal from the leader radar transceiver IC 102). In situations where any time delay ($\Delta t_{L2F}$) is experienced by the follower radar transceiver ICs 104 and 106, the down-converted received signal (i.e., the IF signal) is represented as $f_{Beat}=\Delta f_{Nominal}+\Delta t_{L2F}*K_f$. It will be appreciated that the aforementioned examples are described for case of understanding and a reverse situation is also possible. In other words, during the first round of the test mode, the leader radar transceiver IC 102 and the follower radar transceiver ICs 104 and 106 are time asynchronous and during the second round of the test mode, the leader radar transceiver IC 102 and the follower radar transceiver ICs 104 and 106 are time synchronous.

As described above, the radar system 100 needs to operate functionally safe. Therefore, to ensure functional safety, periodic and repeated testing for synchronization between the leader radar transceiver IC 102 and the follower radar transceiver ICs 104 and 106 identifies errors and/or delays in the radar system 100. The test mode, selected at the leader radar transceiver IC 102, is performed before normal radar sensor operation or after normal radar sensor operation (i.e., normal detection mode). These aforementioned example scenarios identify poor functional safety (i.e., functional safety that does not meet a minimum safety standard for safe motor vehicle operation) and the radar system 100 is unable to detect correct information in the environment. Stated differently, the follower radar transceiver ICs 104 and 106 operate time asynchronous with the leader radar transceiver IC 102, such that any data detected in the environment is inaccurate. To illustrate, at time T0, the leader radar transceiver IC 102 detects an external vehicle at position A after receipt of the chirp signal, while at time T1 and/or T2, at least one of the follower radar transceiver ICs 104 and 106 detects the external vehicle at position B after receipt of the local chirp signal, which does not accurately reflect the position of the external vehicle because the data detected by the leader radar transceiver IC 102 differs from the data detected by the follower radar transceiver ICs 104 and 106.

In various embodiments, the leader radar transceiver IC 102 includes a plurality of transmitter antennas 112 and a plurality of receiver antennas 113. Similarly, in various embodiments, the follower radar transceiver IC 104 includes a plurality of transmitter antennas 114 and a plurality of receiver antennas 115. Lastly, in various embodiments, the follower radar transceiver IC 106 includes a plurality of transmitter antennas 116 and a plurality of receiver antennas 117. In the depicted example, each of the plurality of transmitter antennas 112, 114, 116 and each of the plurality of receiver antennas 113, 115, 117 are illustrated with a single antenna. However, it will be appreciated that the plurality of transmitter antennas 112, 114, 116 and the plurality of receiver antennas 113, 115, 117 are each more than the single antenna. With respect to FIG. 1, the plurality of transmitter antennas 112, 114, 116 and the plurality of receiver antennas 113, 115, 117 depict the single antenna for ease of description and understanding. Furthermore, the plurality of transmitter antennas 114 and 116 on the follower radar transceiver ICs 104 and 106 are disabled. In the depicted example, the leader radar transceiver IC 102 send the trigger signal 108 to the follower radar transceiver ICs 104 and 106, respectively.

Figure 2:
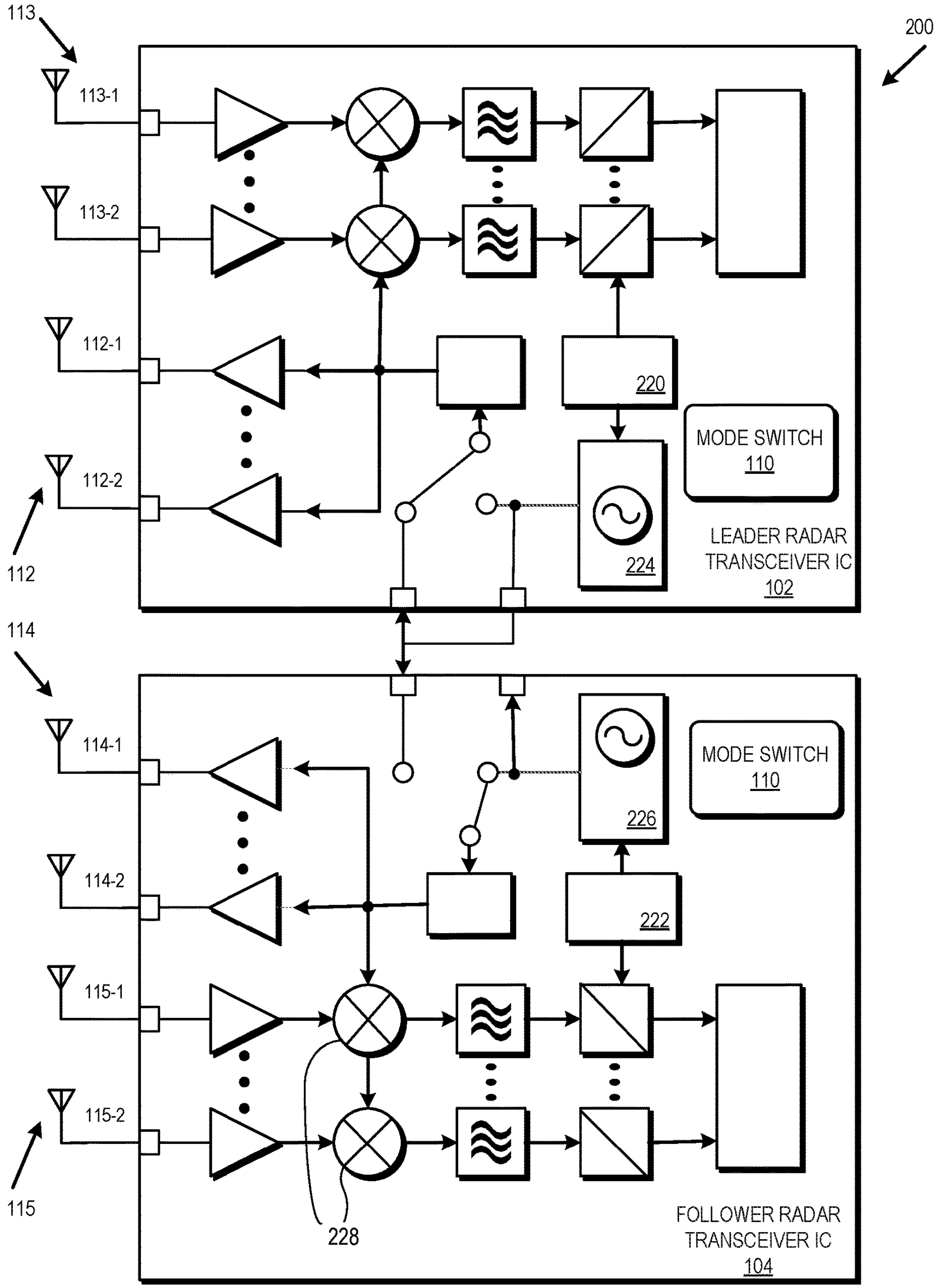
FIG. 2 is a block diagram of a portion of a radar system implementing a leader radar transceiver IC cascaded with a follower radar transceiver IC in accordance with some embodiments.

FIG. 2 illustrates a block diagram of a portion of a radar system 200 implementing the leader radar transceiver IC 102 cascaded with the follower radar transceiver IC 104 in accordance with some embodiments. The radar system 200 may implement or be implemented by aspects of the radar system 100 as described with reference to FIG. 1. In the depicted example, the plurality of transmitter antennas 112 includes a transmitter antenna 112-1 and a transmitter antenna 112-2. The plurality of receiver antennas 113 includes a receiver antenna 113-1 and a receiver antenna 113-2. In various embodiments, the leader radar transceiver IC 102 includes a timing engine 220 and the follower radar transceiver IC 104 includes a timing engine 222. The timing engine 220 is used by the leader radar transceiver IC 102 for local timing control and to ensure timing synchronization to the follower radar transceiver IC 104. Moreover, the timing engine 220 starts generation of the chirp signal. The timing engine 220 sends the trigger signal 108 to the timing engine 222, such that all components within the follower radar transceiver IC 104 run at the same time as all components in the leader radar transceiver IC 102. Additionally, the timing engine 222 is used by the follower radar transceiver IC 104 to start generation of the chirp signal with the frequency offset that is time synchronous in response to the trigger signal received during the test mode.

In various embodiments, the leader radar transceiver IC 102 further includes a synthesizer 224 and the follower radar transceiver IC 104 further includes a synthesizer 226. It will be appreciated that although the synthesizer 226 is discussed with respect to the follower radar transceiver IC 104, every other follower radar transceiver IC including the follower radar transceiver IC 106 includes a synthesizer that operates similar the synthesizer 226 described herein. The synthesizer 224 is used by the leader radar transceiver IC 102 to generate the chirp signal with the set frequency. Additionally, the follower radar transceiver IC 104 uses the synthesizer 226 to generate the local chirp signal including the set frequency and the frequency offset. The synthesizer 226 runs time synchronous to the timing engine 222. Moreover, the frequency synthesizer 226 is connected to the plurality of transmitter antennas 114 and a plurality of frequency mixers (a.k.a., mixers/down-converters) 228 via a frequency multiplier. As such, the synthesizer 226 generates the local chirp signal, which is parameterized with the set frequency and the frequency offset.

In various embodiments, both the leader radar transceiver IC 102 and the follower radar transceiver IC 104 include additional components. For example, the leader radar transceiver IC 102 and the follower radar transceiver IC 104 include a system clock, a plurality of amplifiers, a plurality of high-pass filters, a plurality of low-pass filters, a plurality of bandpass filters, a plurality of analog-to-digital converters (ADC), and a processing unit. The system clock is used to control timing of all components and thus synchronizes operation of each component on the leader radar transceiver IC 102 or the follower radar transceiver IC 104. The amplifiers increase or boost the strength of the signal either transmitted by the plurality of transmitter antennas 112 or received by the plurality of receiver antennas 113, 115. The frequency mixers 228 act as a multiplier to two input signals that, in some embodiments, produce a signal with a sum and difference of the original frequencies. The high-pass filter removes low frequency signals that originate from self-interference (i.e., transmitted signals from the transmitter antenna that are received by the receiver antenna during transmission and not based on return of the signal from a target of interest). On the other hand, the low-pass filter is used for anti-aliasing (i.e., attenuation of signal with a frequency beyond a limit of the sampling theorem) to pass a signal to the ADC units. The bandpass filter is a combination of the high-pass filter and the low-pass filter and therefore provides the frequency range between the high-pass filter frequency and the low-pass filter frequency. In other words, the frequency range of the bandpass filter is determined by a high-pass filter cut-off frequency and a low-pass filter cut-off frequency. Furthermore, the bandpass filter is parameterized with the cut-off frequencies in accordance with regular processing requirements of the radar system 100. The ADC converts analog signals to digital signals. Lastly, the processing unit (e.g., a controller, a microcontroller, a computer processing unit (CPU)) is used to perform post-processing on digitized signals, such as, for example, using Fast Fourier Transform (FFT) on the ADC converted signal to extract the beat frequency.

Figure 3:
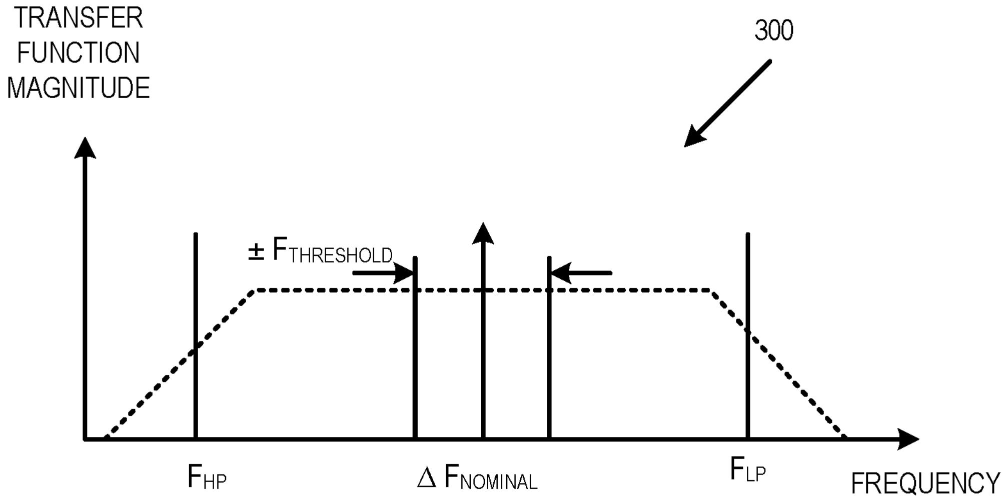
FIG. 3 is a plot of a frequency range for an offset frequency in accordance with some embodiments.

FIG. 3 illustrates a plot 300 of a characteristic of the bandpass filter in accordance with some embodiments. In the depicted example, the plot 300 illustrates the frequency offset with a frequency range where the BIST reports time synchronous or "in-sync". The frequency range is denoted by $+f_{threshold}$. In various embodiments, the follower radar transceiver ICs 104 and 106 use a frequency offset based on the bandpass filter cut-off frequencies. Specifically, the synthesizer 226 uses the frequency offset between the high-pass filter cut-off frequency and the low-pass filter cut-off frequency. As discussed above, the beat frequency is determined to match the offset frequency in response to the follower radar transceiver ICs 104 and 106 receiving the trigger signal 108 that is time synchronized from the leader radar transceiver IC 102. As such, in the time synchronous example, the beat frequency filter matches the known frequency offset. However, in the time asynchronous example, there are two failure cases. First, asynchronization due to a large time offset between the leader radar transceiver IC 102 and the follower radar transceiver ICs 104 and/or 106. In the first case, the beat frequency determined by the bandpass filter exceeds the high-pass filter cut-off frequency or the low-pass filter cut-off frequency. Additionally, the received signal is too attenuated that signal strength is insufficient for reliable frequency measurement. Thus, the signal strength would be determined and in response to the signal strength exceeding a power threshold, determine the beat frequency to compare to the frequency offset. Accordingly, the trigger signal 108 was prevented and/or delayed between transmission and receipt by the follower radar transceiver ICs 104 and 106. Second, asynchronization due to a small time offset occurs where $f_{Beat}>=f_{HP}$ and $f_{Beat}<=f_{LP}$. In this case, the signal strength is high enough for a reliable frequency measurement. Asynchronization is detected by comparing the beat frequency to the frequency offset. Specifically, asynchronization is detected where the beat frequency differs from the frequency offset.

Figure 4:
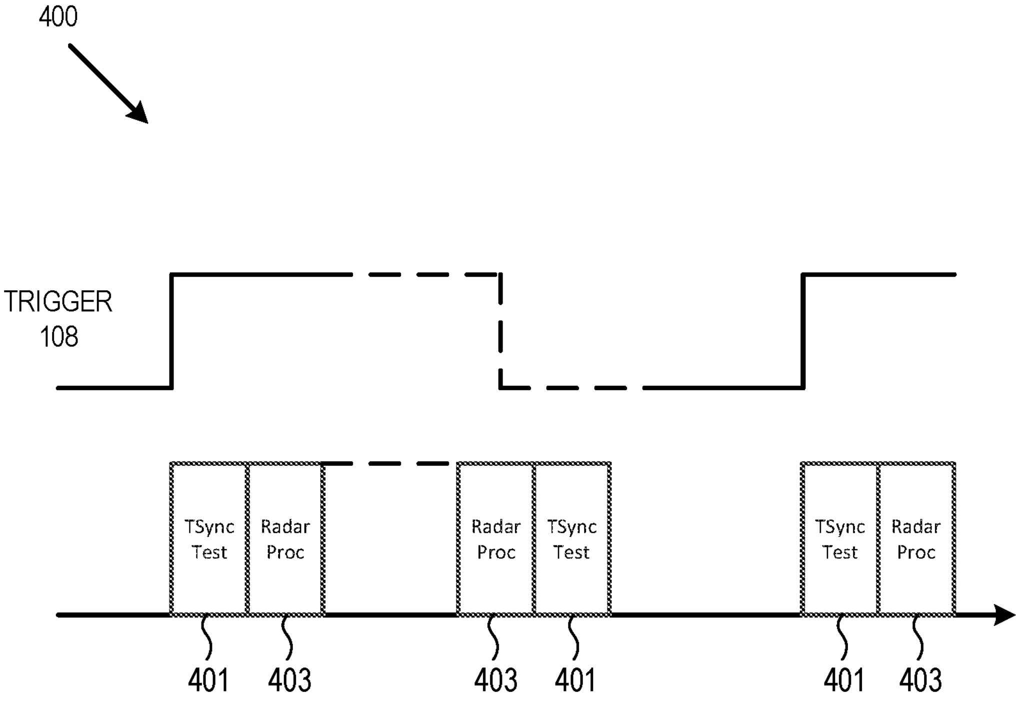
FIG. 4 is a plot of execution of a testing mode during transmission of a trigger signal in accordance with some embodiments.

FIG. 4 illustrates a plot 400 of execution of a testing mode during transmission of the trigger signal 108 in accordance with some embodiments. In the depicted example, the test mode, Tsync Test 401, is initiated in response to transmission of the trigger signal 108. For example, the leader radar transceiver IC 102 sends the trigger signal 108 to the follower radar transceiver ICs 104 and 106 in response to an event. Subsequently, in response to confirmation of time synchronization during the test mode, the leader radar transceiver IC 102 and the follower radar transceiver ICs 104 and 106 operate in the normal detection mode, Radar Proc 403. Alternatively, and/or in addition thereto, the Radar Proc 403 is performed in response to transmission of the trigger signal 108 from the leader radar transceiver IC 102 to the follower radar transceiver ICs 104 and 106. Subsequently, the leader radar transceiver IC 102 and the follower radar transceiver ICs 104 and 106 operate in the Tsync Test 401, to determine time synchronization. Therefore, in a first sequence, the Tsync Test 401 occurs before Radar Proc 403. In a second sequence, different from the first sequence, the Tsync Test 401 occurs after the Radar Proc 403. The order of the sequence is determined by the mode switch 110.

Figure 5:
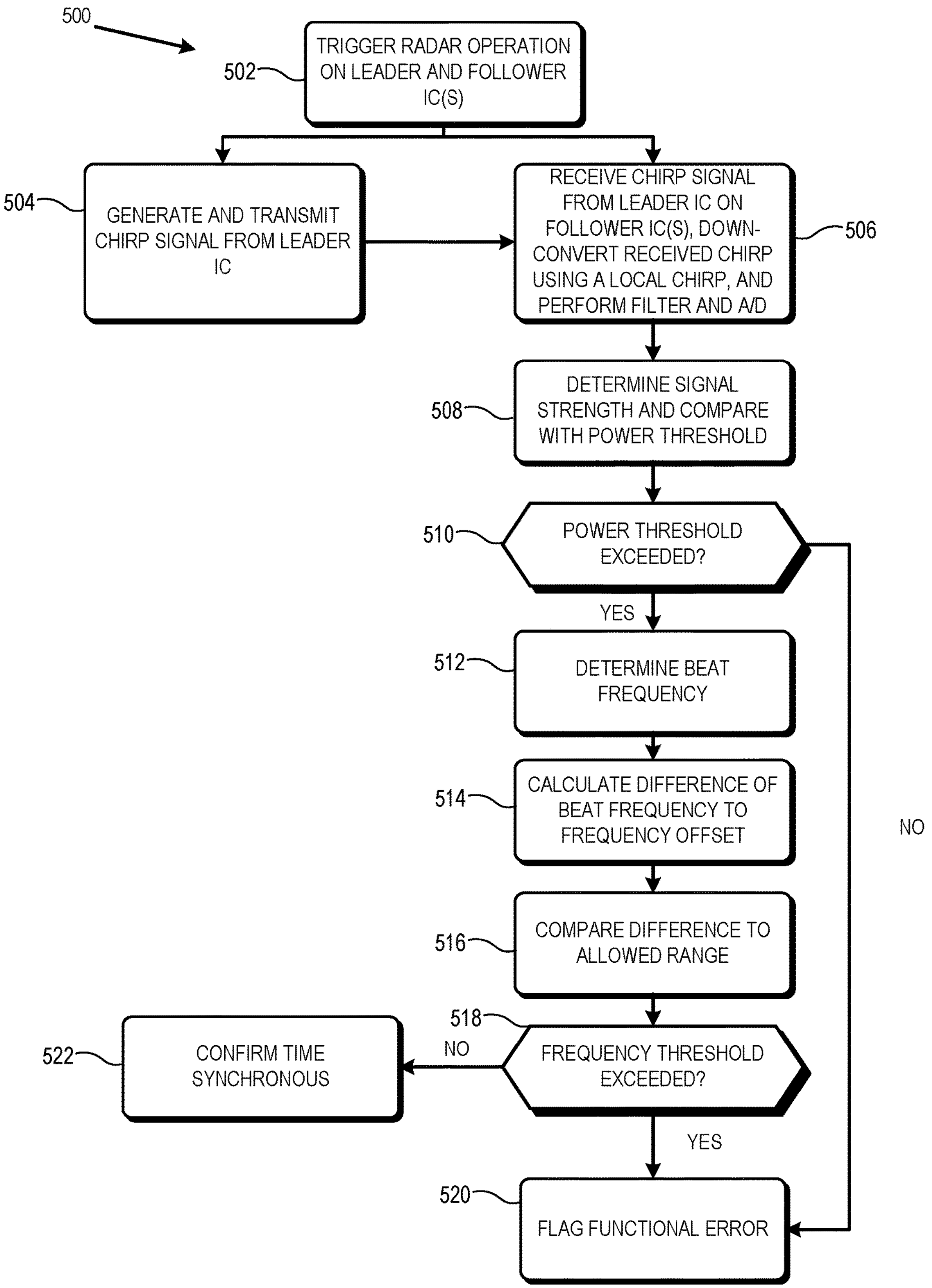
FIG. 5 is a flow diagram of a method for testing signal strength and time synchronization between a leader radar transceiver IC and a follower radar transceiver IC in accordance with some embodiments.

FIG. 5 illustrates a flow diagram of a method 500 for testing signal strength and time synchronization between the leader radar transceiver IC 102 and the follower radar transceiver ICs 104 and 106 in accordance with some embodiments. The method 500 is described with respect to an example implementation of the radar system 100 of FIG. 1. At block 502, the leader radar transceiver IC 102 sends the trigger signal 108 to the follower radar transceiver ICs 104 and 106 in response to an event. In other words, the leader radar transceiver IC 102 uses the trigger signal 108 as an initiation signal to the follower radar transceiver ICs 104 and 106 to begin additional operations. Furthermore, the leader radar transceiver IC 102 and the follower radar transceiver ICs 104 and 106 perform the test mode in response to the trigger signal 108. At block 504, the leader radar transceiver IC 102 starts generation and transmission of the chirp signal at the set frequency. At block 506, in response to receiving the trigger signal 108 and in simultaneous operation with block 504, the follower radar transceiver ICs 104 and 106 starts generating their local chirp signal based on the sum of the set frequency and frequency offset. The follower radar transceiver ICs 104 and 106 receive the chirp signal from the leader radar transceiver IC 102 and down-convert it to the IF signal using the local chirp signal. Also, the follower radar transceiver ICs 104 and 106 filter and A/D convert the down-converted signal. Furthermore, the follower radar transceiver ICs 104 and 106 perform post-processing by filtering and A/D-converting the IF signal.

At block 508, the follower radar transceiver ICs 104 and 106 compute the signal strength of the down-converted and filtered signal, such that the signal strength is above a power certain threshold and that beat frequency can be computed reliably afterwards. At block 510, the follower radar transceiver ICs 104 and 106 determine whether the signal strength is above the power threshold. If the signal strength does not exceed the power threshold, the signal strength is too low, and functional error is flagged at block 520.

At block 512, the follower radar transceiver ICs 104 and 106 measure the beat frequency. At block 514, the follower radar transceiver ICs 104 and 106 determine whether the difference between the measured beat frequency and frequency offset exceeds a certain frequency threshold (i.e., $f_{threshold}$). At block 516, the follower radar transceiver ICs 104 and 106 compare the difference of the beat frequency to the frequency threshold. At block 518, the follower radar transceiver ICs 104 and 106 identify whether the leader radar transceiver IC 102 and the follower radar transceiver ICs 104 and 106 are time asynchronous in response to the beat frequency not matching the frequency offset. At block 520, the follower radar transceiver ICs 104 and 106 flag a functional error in response to the beat frequency exceeding the frequency threshold. Accordingly, the radar system 100 is not functionally safe because the radar system 100 has inaccurate detection due to asynchronous operation between the leader radar transceiver 102 and the follower radar transceiver ICs 104 and 106. At block 522, the follower radar transceiver ICs 104 and 106 confirm time synchronization in response to the beat frequency matching the frequency offset.

Figure 6:
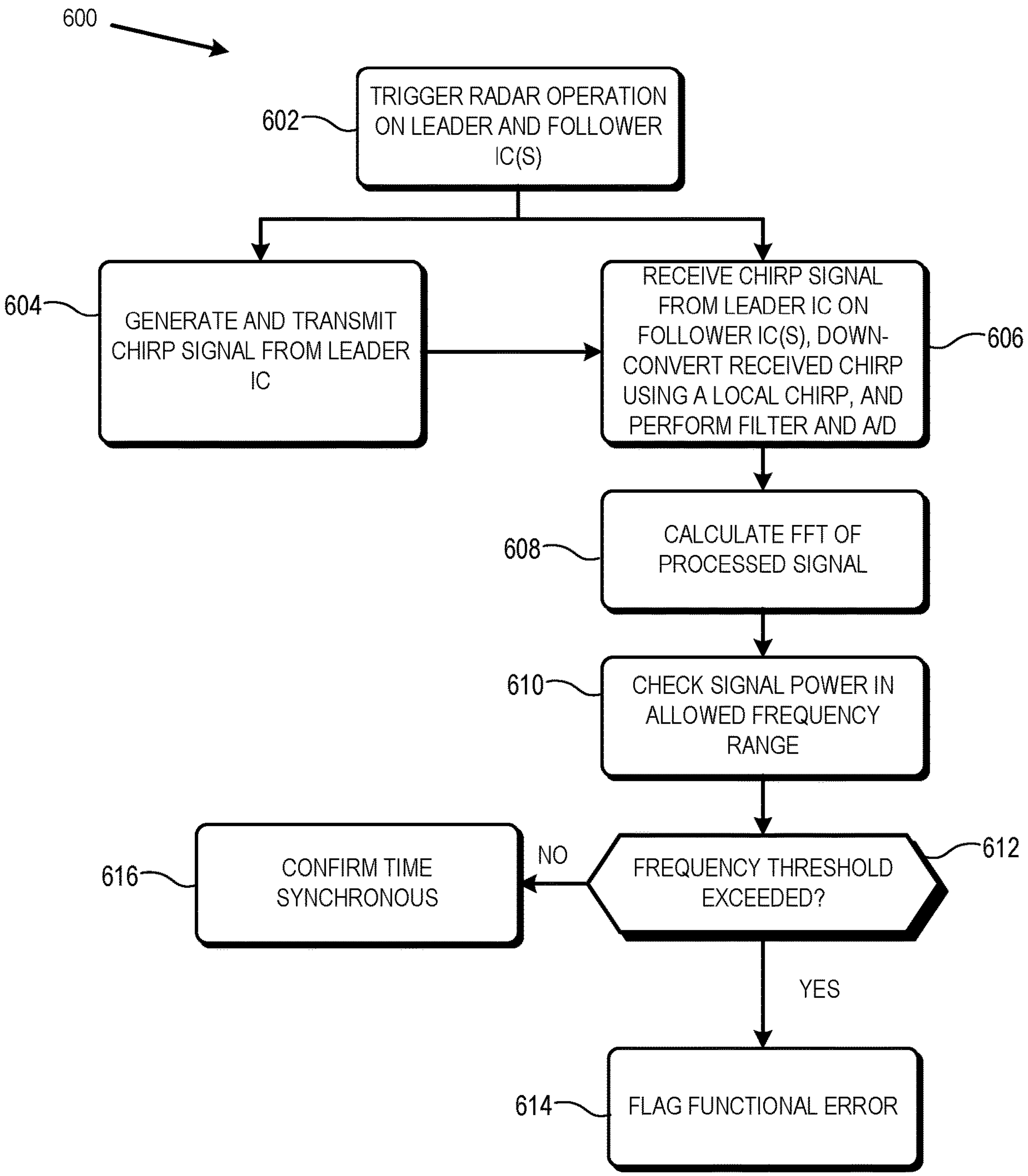
FIG. 6 is a flow diagram of a method for testing time synchronization between a leader radar transceiver IC and a follower radar transceiver IC in accordance with some embodiments.

FIG. 6 is a flow diagram of a method 600 for testing time synchronization between the leader radar transceiver IC 10 and the follower radar transceiver ICs 104 and 106 in accordance with some embodiments. The method 600 is described with respect to an example implementation of the radar system 100 of FIG. 1. At block 602, the leader radar transceiver IC 102 sends the trigger signal 108 to the follower radar transceiver ICs 104 and 106 in response to an event. In other words, the leader radar transceiver IC 102 uses the trigger signal 108 as an initiation signal to the follower radar transceiver ICs 104 and 106 to begin additional operations. Furthermore, the leader radar transceiver IC 102 and the follower radar transceiver ICs 104 and 106 perform the test mode in response to the trigger signal 108. At block 604, the leader radar transceiver IC 102 starts generation and transmission of the chirp signal at the set frequency. At block 606, in response to receiving the trigger signal 108 and in simultaneous operation with block 604, the follower radar transceiver ICs 104 and 106 starts generating their local chirp signal based on the sum of the set frequency and frequency offset. The follower radar transceiver ICs 104 and 106 receive the chirp signal from the leader radar transceiver IC 102 and down-convert it to the IF signal using the local chirp signal. Also, the follower radar transceiver ICs 104 and 106 filter and A/D convert the down-converted signal. Furthermore, the follower radar transceiver ICs 104 and 106 perform post-processing by filtering and A/D-converting the IF signal.

At block 608, the follower radar transceiver ICs 104 and 106 use FFT to calculate the beat frequency from the IF signal. At block 610, the follower radar transceiver ICs 104 and 106 checks the signal strength is high enough and that the beat frequency is within the frequency threshold. At block 612, the follower radar transceiver ICs 104 and 106 identify whether the leader radar transceiver IC 102 and the follower radar transceiver ICs 104 and 106 are time asynchronous in response to the beat frequency not matching the frequency offset. At block 614, the follower radar transceiver ICs 104 and 106 flag a functional error in response to the beat frequency exceeding the frequency threshold. Accordingly, the radar system 100 is not functionally safe because the radar system 100 has inaccurate detection due to asynchronous operation between the leader radar transceiver 102 and the follower radar transceiver ICs 104 and 106. At block 616, the follower radar transceiver ICs 104 and 106 confirm time synchronization in response to the beat frequency matching the frequency offset.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:

transmitting, by a first radar transceiver integrated circuit (IC), a trigger signal;

in response to the trigger signal, transmitting a chirp signal with a set frequency by the first radar transceiver IC;

in response to receiving the trigger signal and the chirp signal from the first radar transceiver IC, generating, by at least one second radar transceiver IC, a local chirp signal that is parameterized by a sum of the set frequency and a frequency offset to down-convert the received chirp signal to an intermediate frequency (IF) signal; and determining a level of synchronization of the first radar transceiver IC with the at least one second radar transceiver IC based on comparing a beat frequency to the frequency offset.

2. The method of claim 1, wherein generating the local chirp signal comprises generating the frequency offset in a frequency range between a high-pass filter cut-off frequency and a low-pass filter cut-off frequency.

3. The method of claim 2, wherein the at least one second radar transceiver IC flags a functional safety error in response to the beat frequency exceeding the frequency range.

4. The method of claim 1, wherein generating the local chirp signal comprises:

generating the local chirp signal by a frequency synthesizer of the at least one second radar transceiver IC.

5. The method of claim 4, wherein generating the local chirp signal by the frequency synthesizer is performed during a test mode.

6. The method of claim 1, wherein the beat frequency comprises a difference between the chirp signal that is received by the at least one second radar transceiver IC and the local chirp signal.

7. The method of claim 6, wherein comparing the beat frequency to the frequency offset comprises:

determining a signal strength of the chirp signal that is received; and in response to the signal strength exceeding a power threshold, determine the beat frequency to compare to the frequency offset.

8. The method of claim 1, wherein generating the local chirp signal occurs simultaneously to generation and transmission of the chirp signal.

9. A radar system, comprising:

at least one second radar transceiver integrated circuit (IC) configured to receive a chirp signal transmitted from a first radar transceiver IC and generate a local chirp signal parameterized by a set frequency and a frequency offset in response to receiving a trigger signal from the first radar transceiver IC to test a level of synchronization of the first radar transceiver IC with the at least one second radar transceiver IC based on comparing a beat frequency to the frequency offset.

10. The radar system of claim 9, wherein the at least one second radar transceiver IC is further configured to:

generate the frequency offset in a frequency range between a high-pass filter cut-off frequency and a low-pass filter cut-off frequency.

11. The radar system of claim 10, wherein the at least one second radar transceiver IC is further configured to:

flag a functional safety error in response to the beat frequency exceeding the frequency range.

12. The radar system of claim 9, wherein the at least one second radar transceiver IC is further configured to:

generate the local chirp signal by a frequency synthesizer.

13. The radar system of claim 12, wherein the at least one second radar transceiver IC is further configured to:

generate the local chirp signal by the frequency synthesizer during a test mode.

14. The radar system of claim 9, wherein the at least one second radar transceiver IC is further configured to:

determine the beat frequency based on a difference between the chirp signal that is received and the local chirp signal.

15. The radar system of claim 14, wherein the at least one second radar transceiver IC is further configured to:

determine a signal strength of the chirp signal that is received; and in response to the signal strength exceeding a power threshold, determine the beat frequency to compare to the frequency offset.

16. The radar system of claim 9, wherein the first radar transceiver IC is cascaded with the at least one second radar transceiver IC.

17. A method, comprising:

transmitting, by a first radar transceiver integrated circuit (IC), a trigger signal;

generating and transmitting a chirp signal based on a set frequency and determined by a first synthesizer of the first radar transceiver IC;

receiving, by a plurality of second radar transceiver ICs, the chirp signal and generating a local chirp signal based on the set frequency and a frequency offset using a second synthesizer of each of the plurality of second radar transceiver ICs in response to receiving the trigger signal from the first radar transceiver IC; and flagging a functional error in response to a beat frequency being different from the frequency offset.

18. The method of claim 17, wherein the trigger signal is transmitted prior to normal operation of the first radar transceiver IC and the plurality of second radar transceiver ICs, or after normal operation of the first radar transceiver IC and the plurality of second radar transceiver ICs.

19. The method of claim 17, further comprising:

down-converting the chirp signal with the local chirp signal to an intermediate frequency (IF) signal.

20. The method of claim 19, wherein flagging a functional error comprises:

comparing the beat frequency at each of the plurality of second radar transceiver ICs to the frequency offset to determine a difference between the beat frequency and the frequency offset.

* * * * *